United States Patent

Steckelberg et al.

Patent Number: 6,090,163
Date of Patent: Jul. 18, 2000

[54] RED-DYEING DYE MIXTURES OF WATER-SOLUBLE FIBER-REACTIVE AZO DYES AND THEIR USE

[75] Inventors: Joachim Steckelberg, Hofheim; Ronald P. Pedemonte, Eppstein-Vockenhausen, both of Germany

[73] Assignee: Dystar Textilfarben GmbH & Co. Deutschland KG, Germany

[21] Appl. No.: 09/217,355

[22] Filed: Dec. 21, 1998

[51] Int. Cl.[7] ............ D06P 1/382; D06P 1/384; D06P 3/66; C09B 67/24

[52] U.S. Cl. ............ 8/549; 8/641; 8/918; 8/924

[58] Field of Search ............ 8/549, 641, 918, 8/924

[56] References Cited

U.S. PATENT DOCUMENTS

| | | | |
|---|---|---|---|
| 4,485,041 | 11/1984 | Hoyer et al. | 534/637 |
| 4,515,598 | 5/1985 | Meininger et al. | 8/549 |
| 4,649,193 | 3/1987 | Meininger et al. | 534/622 |
| 4,725,675 | 2/1988 | Meininger et al. | 534/638 |
| 5,225,544 | 7/1993 | Dannheim et al. | 534/642 |
| 5,334,709 | 8/1994 | Dannheim et al. | 534/618 |
| 5,548,072 | 8/1996 | Dannheim et al. | 534/635 |
| 5,556,435 | 9/1996 | Russ et al. | 8/549 |

FOREIGN PATENT DOCUMENTS

| | | |
|---|---|---|
| 0 629 666 | 12/1994 | European Pat. Off. . |
| 0 719 841 | 7/1996 | European Pat. Off. . |

*Primary Examiner*—Margaret Einsmann
*Attorney, Agent, or Firm*—Connolly Bove Lodge & Hutz LLP

[57] ABSTRACT

Described are dye mixtures of dyes of the general formulae (1) and (2)

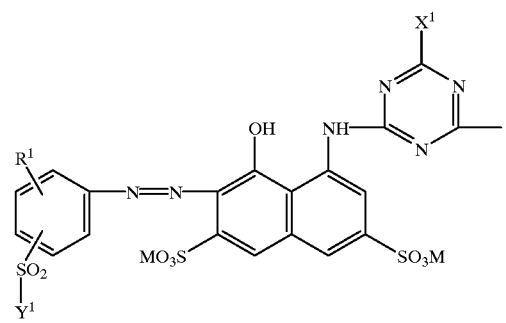

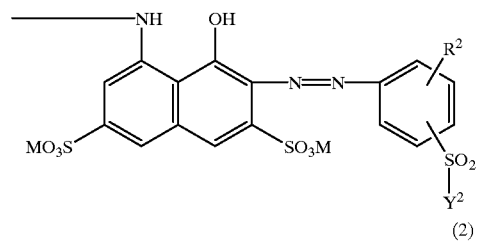

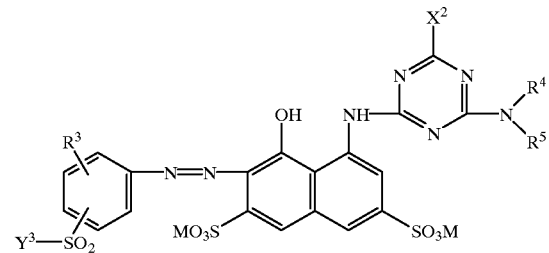

where M is hydrogen, an alkali metal or the equivalent of an alkaline earth metal, $R^1$, $R^2$ and $R^3$ are independently hydrogen or sulfo, $X^1$ and $X^2$, are independently chlorine, fluorine, hydroxy, alkoxy of 1 to 4 carbon atoms, optionally substituted phenyl, optionally substituted morpholino, optionally substituted pyrimidino, cyanoamino or an amino group of the formula —$NR^4R^5$, where $R^4$ is hydrogen, alkyl of 1 to 4 carbon atoms, unsubstituted or sulfo-substituted phenyl or unsubstituted or sulfo-substituted naphthyl, $R^5$ is hydrogen, optionally substituted alkyl, which may be interrupted by oxy or amino, or optionally substituted phenyl or unsubstituted or sulfo-substituted naphthyl, or the group —$NR^4R^5$ is the radical of an aliphatic heterocycle, the groups $Y^1$—$SO_2$—, $Y^2$—$SO_2$— and $Y^3$—$SO_2$— are each a fiber-reactive radical of the vinyl sulfone series and are attached to the benzene nucleus meta or para to the azo group.

18 Claims, No Drawings

RED-DYEING DYE MIXTURES OF WATER-SOLUBLE FIBER-REACTIVE AZO DYES AND THEIR USE

The invention relates to the technical field of fiber-reactive azo dyes.

U.S. Pat. Nos. 4,485,041, 4,515,598, 4,649,193, 4,725,675, 5,225,544 and 5,334,709 and European Patent Application Publication Nos. 0,629,666 and 0,719,841 disclose red-dyeing azo dyes which have certain application defects, for example an excessive dependence of the color yield on changing dyeing parameters in the dyeing process or an insufficient color build-up on cotton (good color build-up follows from the ability of a dye to produce a stronger dyeing from an increased dye concentration in the dyebath). Possible consequences of these deficiencies are poor reproducibilities for the dyeings which are obtainable. However, it is particularly important to obtain dyeings having a good color yield, i.e., dyeings whose depth of shade is very high in relation to the amount of dye used, for example in comparison with other dyes, because of the coloring property of the dye itself (high absorbance) and because of the dyeing characteristics of this dye, such as good affinity and a high yield of fixation. If mixtures of dyes having a certain color yield are used, the color yield of this mixture of dyes will generally be the sum total of the color yields of the individual dyes, which is why the color yield of a mixture of, for example, two dyes will be less than the color yield resulting from the dye having the larger color yield property being used as a single dye, but in the total amount of the two individual dyes.

The present invention, then, provides dye mixtures of the azo dyes conforming to the general formulae (1) and (2) whose color strength is surprisingly higher than the sum total of the color strengths provided by the individual dyes of the dye mixture. This synergistic effect also shows itself in improved build-up characteristics on the part of the mixture of the invention compared with individual dyes present in the mixture.

The invention accordingly provides dye mixtures comprising one or more, such as two or three, preferably 1 or 2, dyes of the general formula (1) and one or more, such as two or three, preferably 1 or 2, dyes of the general formula (2) in a molar ratio of the dye or dyes (1) and the dye or dyes (2) of 90:1 to 10:90, preferably of 70:30 to 30:70, especially of 60:40 to 40:60

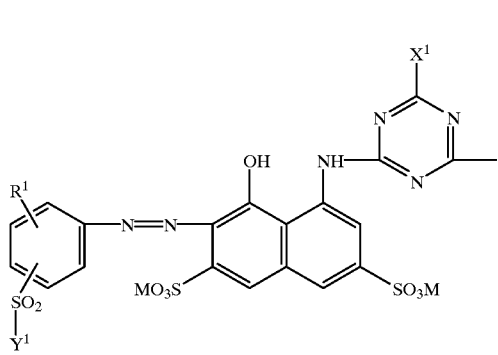

(1)

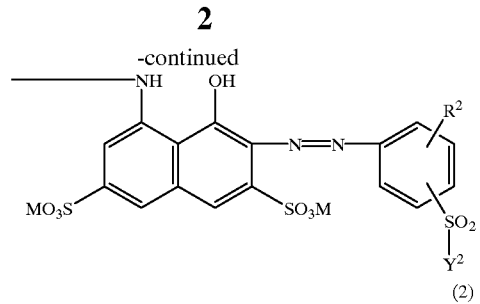

(2)

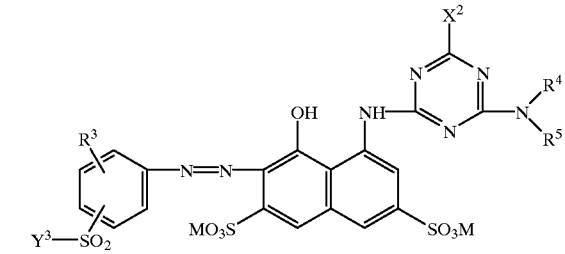

where

M is hydrogen, an alkali metal, such as sodium, potassium or lithium, or the equivalent of an alkaline earth metal, as of calcium, preferably hydrogen and especially sodium, potassium or lithium;

$R^1$ is hydrogen or sulfo, preferably hydrogen;

$R^2$ is hydrogen or sulfo, preferably hydrogen;

$R^3$ is hydrogen or sulfo, preferably hydrogen;

$X^1$ is chlorine, fluorine, hydroxy, alkoxy of 1 to 4 carbon atoms, such as methoxy and ethoxy, phenyl, which may be substituted, for example by 1 or 2 substituents selected from the group consisting of alkyl of 1 to 4 carbon atoms, such as ethyl and especially methyl, alkoxy of 1 to 4 carbon atoms, such as ethoxy and especially methoxy, fluorine, chlorine, bromine, cyano and sulfo, or is optionally substituted N-morpholino or N-pyrimidino or a group of the formula —NM-CN where M is as defined above, or is an amino group of the below-defined general formula —$NR^4R^5$, and is preferably chlorine or fluorine and especially chlorine;

$X^2$ has one of the meanings of $X^1$ and is preferably fluorine or chlorine, especially chlorine;

$Y^1$ is vinyl or is ethyl which is substituted in the β-position by an alkali-eliminable substituent, for example by chlorine, sulfato, thiosulfato, phosphate, alkanoyloxy of 2 to 5 carbon atoms, such as acetyloxy, and sulfobenzoyloxy, and is preferably vinyl, β-chloroethyl and β-sulfatoethyl and particularly preferably vinyl and β-sulfatoethyl;

$Y^2$ has one of the meanings of $Y^1$;

$Y^3$ has one of the meanings of $Y^1$;

$R^4$ is hydrogen or alkyl of 1 to 4 carbon atoms, such as methyl and ethyl, or is phenyl, monosulfophenyl, disulfophenyl, naphthyl, monosulfonaphthyl or disulfonaphthyl and is preferably hydrogen, methyl or phenyl;

$R^5$ is hydrogen, alkyl of 1 to 6 carbon atoms, such as methyl, ethyl and butyl, which may be substituted by 1 or 2 substituents from the group consisting of sulfo, carboxy, hydroxy, alkoxy of 1 to 4 carbon atoms, such as methoxy and ethoxy, and amino, such as β-sulfoethyl, or is alkyl of 2 to 6 carbon atoms which may be interrupted by a group —O— or —NH— and is substituted by a group of the formula —SO$_2$—Y$^4$ where Y$^4$ has a meaning of Y$^1$, for example a group of the formula —(CH$_2$)$_2$—SO$_2$—Y$^4$, —(CH$_2$)$_3$—SO$_2$—Y$^4$ and —(CH$_2$)$_2$—O—(CH$_2$)$_2$—SO$_2$—Y$^4$, or is phenyl which may be substituted by 1 or 2 substituents selected from the group consisting of sulfo, carboxy, hydroxy, alkoxy of 1 to 4 carbon atoms, such as methoxy and ethoxy, alkyl of 1 to 4 carbon atoms, such as methyl and ethyl, and acetylamino, such as monosulfophenyl and disulfophenyl, especially 3-sulfophenyl, or is naphthyl, monosulfonaphthyl or disulfonaphthyl, or R$^4$ and R$^5$ are together an alkylene of 4 to 6 carbon atoms and combine with the nitrogen atom to form the radical of an aliphatic heterocycle, which alkylene may be interrupted by 1 or 2 hetero groups selected from the group consisting of the formulae —O—, —NH—, —N(CH$_3$)— and —NH—CO—, for example N-morpholino, N-piperidino and N-piperazino;

the groups Y$^1$—SO$_2$—, —SO$_2$—Y$^2$ and Y$^3$—SO$_2$— are attached to the benzene nucleus meta or para to the azo group.

Hereinbelow the dyes of the general formulae (1) may be referred to globally as "dyes (1)" and the dyes of the general formula (2) may be referred to globally as "dyes (2)". They are known from the patent documents cited at the beginning or can be prepared similarly to the methods described therein.

In the foregoing general formulae and also in the subsequent general formulae, the individual elements of the formulae, whether they bear identical or different designations within any one general formula, can have meanings under their definition which are mutually identical or different.

The terms "sulfo", "thiosulfato", "carboxy", "phosphate" and "sulfato" cover not only the acid form but also the salt form of the respective groups. Accordingly, sulfo groups are groups conforming to the general formula —SO$_3$M, thiosulfato groups are groups conforming to the general formula —S—SO$_3$M, carboxy groups are groups conforming to the general formula —COOM, phosphate groups are groups conforming to the general formula —OPO$_3$M$_2$, and sulfato groups are groups conforming to the general formula —OSO$_3$M, where each M is as defined above.

The dyes of the general formula (1) may (especially in the case of the same chromophore) have within the meaning of Y$^1$ or Y$^2$ or Y$^1$ and Y$^2$ different fiber-reactive groups —SO$_2$—Y$^1$ and —SO$_2$—Y$^2$ (the same also applies to the dyes of the general formula (2) with regard to Y$^3$ and Y$^4$). In particular, the dye mixtures may include dyes of the same chromophore conforming to the said general formulae in which the fiber-reactive groups —SO$_2$—Y$^1$ and —SO$_2$—Y$^2$ or —SO$_2$—Y$^3$ and —SO$_2$—Y$^4$ are on the one hand vinylsulfonyl groups and on the other β-chloroethylsulfonyl or β-thiosulfatoethylsulfonyl or preferably β-sulfatoethylsulfonyl groups.

If the dye mixtures include the respective dye components in part as dye with a vinylsulfonyl group, then the proportion accounted for by the respective dye having a vinylsulfonyl group will be up to about 30 mol %, based on the respective dye chromophore.

The dye mixtures of the invention are preparable in a conventional manner, as by mechanically mixing the individual dyes in the necessary proportions, whether in the form of their dye powders or granules or their synthesis solution or of aqueous solutions of the individual dyes in general, which may still include customary auxiliaries.

However, the dye mixtures of the invention can also be prepared chemically using the diazo and coupling components and the triazine components of the individual dyes (1) and (2), by subjecting these together in a batch to the customary diazotization and coupling reactions or reaction conditions of halotriazine derivatives with, for example, amino compounds in a manner familiar to the person skilled in the art and in the necessary proportions. For instance, one or more triazine compounds conforming to the general formulae (3a) and (3b)

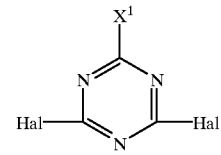

(3a)

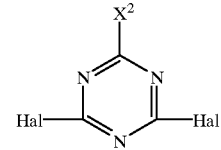

(3b)

where Hal is halogen, such as chlorine or fluorine, and X$^1$ and X$^2$ are each as defined above, preferably chlorine or fluorine, can be reacted with 1-amino-3,6-disulfo-8-naphthol and with one or more amino compounds conforming to the general formula —NR$^4$R$^5$ where R$^4$ and R$^5$ are each as defined above in mixture or in any desired order initially at a temperature between 0 and 60° C., preferably between 0 and 40° C., and at a pH between 0 and 8, preferably between 1 and 5, and then at a temperature between 0 and 60° C., preferably between 20 and 40° C., and at a pH between 2 and 8, preferably between 3 and 5. The resulting compounds conforming to the general formulae (4a) and (4b)

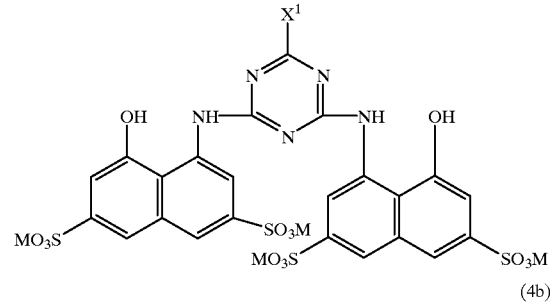

(4a)

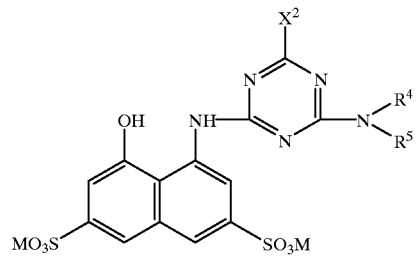

(4b)

where M, $X^1$, $X^2$, $R^4$ and $R^5$ are each as defined above, can then be coupled with one or more diazonium salt compounds obtained in a conventional manner from the aniline compounds conforming to the general formulae (5a), (5b) and (5c)

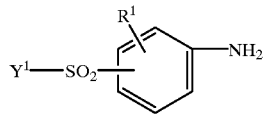

(5a)

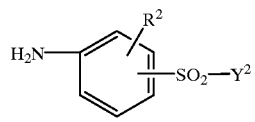

(5b)

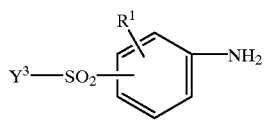

(5c)

where $R^1$, $R^2$, $R^3$, $Y^1$, $Y^2$ and $Y^3$ are each as defined above, for example at a temperature between 10 and 50° C., preferably between 20 and 35° C., and at a pH between 3 and 7, preferably between 4 and 5.

Dye mixtures comprising dyes (1) and/or (2) where $X^1$ and/or $X^2$ have a meaning other than halogen can also be prepared by reacting, in dye mixtures comprising dyes (1) and/or (2) where $X^1$ and/or $X^2$ are halogen, these halotriazine azo dyes with a ($C_1$–$C_4$) alkanol, an optionally substituted phenol or naphthol, an optionally substituted morpholine or pyrimidine, with cyanamide or with an amino compound conforming to the general formula $NHR^4R^5$ with $R^4$ and $R^5$ being defined as above, in a conventional manner, for example at a temperature between 10 and 100° C., preferably between 40 and 80° C., and at a pH between 3 and 7, preferably between 4 and 5.

Starting compounds of the general formula $HNR^4R^5$ are for example morpholine, N-[β-(β'-sulfatoethylsulfonyl) ethyl]-N-methylamine, N-methyltaurine and 3-sulfoaniline.

Starting compounds of the general formulae (5a), (5b) and (5c) are for example 4-(β-sulfatoethylsulfonyl)aniline, 3-(β-sulfatoethylsulfonyl)aniline, 2-sulfo-4-(β-sulfatoethylsulfonyl)aniline and 2-sulfo-5-(β-sulfatoethylsulfonyl)aniline, preferably 3- or 4-(β-sulfatoethylsulfonyl)aniline and especially 4-(β-sulfatoethylsulfonyl)aniline, and also derivatives of these compounds in which the β-sulfatoethylsulfonyl is replaced by a vinylsulfonyl or β-thiosulfatoethylsulfonyl or β-chloroethylsulfonyl group.

The separation of the chemically produced dye mixtures of the invention from their synthesis solution can be effected by commonly known methods, for example either by precipitating from the reaction medium by means of electrolytes, for example sodium chloride or potassium chloride, or by evaporating or spray-drying the reaction solution, in which case this reaction solution may have a buffer substance added to it.

The dye mixtures of the invention can be present as a preparation in solid or in liquid (dissolved) form. In solid form, they generally include the electrolyte salts customary for water-soluble and especially for fiber-reactive dyes, such as sodium chloride, potassium chloride and sodium sulfate, and may further comprise the auxiliaries customary in commercial dyes, such as buffer substances capable of setting a pH in aqueous solution between 3 and 7, such as sodium acetate, sodium borate, sodium bicarbonate, sodium dihydrogenphosphate, sodium tricitrate and disodium hydrogenphosphate, small amounts of siccatives or, if they are present in liquid, aqueous solution (including the presence of thickeners of the type customary in print pastes), substances which ensure a long life for these preparations, for example mold preventatives.

In general, the dye mixtures of the invention are present as dye powders comprising from 10 to 80% by weight, based on the dye powder or the preparation, of an electrolyte salt, which is also known as a standardizing agent. These dye powders may further comprise the abovementioned buffer substances in a total amount of up to 5% by weight, based on the dye powder. If the dye mixtures of the invention are present in aqueous solution, the total dye content of these aqueous solutions is up to about 50% by weight, for example between 5 and 50% by weight, and the electrolyte salt content of these aqueous solutions is preferably below 10% by weight, based on the aqueous solution; the aqueous solutions (liquid preparations) may include the aforementioned buffer substances in an amount which is generally up to 10% by weight, preferably up to 2% by weight.

The dye mixtures of the invention have useful application properties. They are used for dyeing or printing hydroxy- and/or carboxamido-containing materials, for example in the form of sheetlike structures, such as paper and leather or of films, for example composed of polyamide, or in bulk, as for example of polyamide and polyurethane, but especially for dyeing or printing these materials in fiber form. Similarly, the solutions obtained in the synthesis of the azo compounds after their mixing to form the dye mixtures of the invention, if desired after or with addition of a buffer substance, and also if desired after concentrating or diluting, can be used directly as liquid preparation for dyeing.

The present invention thus also provides for the use of the dye mixtures of the invention for dyeing and printing these materials, or rather to processes for dyeing or printing these materials in a conventional manner, by using a dye mixture of the invention as colorant. The materials are preferably employed in the form of fiber materials, especially in the form of textile fibers, such as woven fabrics or yarns, as in the form of hanks or wound packages.

Hydroxy-containing materials are those of natural or synthetic origin, for example cellulose fiber materials or their regenerated products and polyvinyl alcohols. Cellulose fiber materials are preferably cotton, but also other vegetable fibers, such as linen, hemp, jute and ramie fibers; regenerated cellulose fibers are for example staple viscose and filament viscose.

Carboxamido-containing materials are for example synthetic and natural polyamides and polyurethanes, especially in the form of fibers, for example wool and other animal hairs, silk, leather, nylon-6,6, nylon-6, nylon-11 and nylon-4.

The dye mixtures of the invention can be applied to and fixed on the substrates mentioned, especially the fiber materials mentioned, by the application techniques known for water-soluble dyes, especially fiber-reactive dyes.

For instance, on cellulose fibers they produce from a long liquor by the exhaust method and by means of various acid-binding agents with or without neutral salts, such as sodium chloride or sodium sulfate, dyeings having very good color yields which are improved compared with the individual dyes. They are preferably dyed from an aqueous bath at temperatures between 40 and 105° C., if desired at temperatures up to 130° C. under superatmospheric pressure, and if desired in the presence of customary dyeing auxiliaries. One possible procedure is to introduce the material into the warm bath and to gradually heat the bath to the desired dyeing temperature and to complete the dyeing process at that temperature. The neutral salts which speed up the exhaustion of the dyes can if desired not be added to the bath until after the actual dyeing temperature has been reached.

The padding process likewise produces excellent color yields and a very good color build-up on cellulose fibers, on which fixing can be effected by batching at room temperature or elevated temperature, for example at up to about 60° C., by steaming or with dry heat in a conventional manner.

Similarly, the customary printing processes for cellulose fibers, which can be carried out either single-phase, for example by printing with a print paste comprising sodium bicarbonate or some other acid-binding agent and by subsequent steaming at 100 to 103° C., or two-phase, for example by printing with a neutral or weakly acid print paste and subsequent fixation either by passing the printed material through a hot electrolyte-comprising alkaline bath or by overpadding with an alkaline electrolyte-comprising padding liquor with subsequent batching of this treated material or subsequent steaming or subsequent treatment with dry heat, produce strong prints with well-defined contours and a clear white ground. The appearance of the prints is not greatly affected by variations in the fixing conditions.

When fixing by means of dry heat in accordance with the customary thermofix processes, hot air from 120 to 200° C. is used. In addition to the customary steam at 101 to 103° C. it is also possible to use superheated steam and high-pressure steam at temperatures of up to 160° C.

The acid-binding agents which effect the fixation of the dyes of the dye mixtures of the invention on the cellulose fibers include for example water-soluble basic salts of the alkali metals and likewise alkaline earth metals of inorganic or organic acids or compounds which liberate alkali in the heat. Especially suitable are the alkali metal hydroxides and alkali metal salts of weak to medium inorganic or organic acids, the preferred alkali metal compounds being the sodium and potassium compounds. Such acid-binding agents include for example sodium hydroxide, potassium hydroxide, sodium carbonate, sodium bicarbonate, potassium carbonate, sodium formate, sodium dihydrogenphosphate, disodium hydrogenphosphate, sodium trichloroacetate, waterglass or trisodium phosphate.

The dye mixtures of the invention are notable for a high yield of fixation when applied to the cellulose fiber materials by dyeing or printing. The cellulose dyeings obtained following the customary aftertreatment by rinsing to remove unfixed dye portions exhibit excellent wetfastnesses, in particular since such unfixed dye portions are easily washed off on account of their good solubility in cold water. The dyeings and prints obtainable with the dye mixtures of the invention have bright hues; especially the dyeings and prints on cellulose fiber materials have good lightfastness and very good wetfastnesses, such as wash, milling, water, seawater, crossdyeing and acidic and also alkaline perspiration fastness properties, also good fastness to pleating, hotpressing and rubbing. Adjacent fibers in blend fabrics, such as polyester fibers, are only minimally tainted by the dye mixtures of the invention, if at all.

Furthermore, the dye mixtures of the invention can also be used for the fiber-reactive dyeing of wool. Moreover, wool which has been given a nonfelting or low-felting finish (cf. H. Rath, Lehrbuch der Textilchemie, Springer-Verlag, 3rd Edition (1972), p. 295–299, especially the finish by the so-called Hercosett process (p. 298); J. Soc. Dyers and Colourists 1972, 93–99, and 1975, 33–44) can be dyed with very good fastness properties.

The process of dyeing on wool is here carried out in a conventional manner from an acidic medium. For instance, acetic acid and/or ammonium sulfate or acetic acid and ammonium acetate or sodium acetate may be added to the dyebath to obtain the desired pH. To obtain a dyeing of acceptable levelness, it is advisable to add a customary leveling agent, for example on the basis of a reaction product of cyanuric chloride with 3 times the molar amount of an aminobenzenesulfonic acid and/or of an aminonaphthalenesulfonic acid or on the basis of a reaction product of for example stearylamine with ethylene oxide. For instance, the dye mixture of the invention is preferably subjected to the exhaustion process initially from an acidic dyebath having a pH of about 3.5 to 5.5 under pH control and the pH is then, toward the end of the dyeing time, shifted into the neutral and perhaps weakly alkaline range up to a pH of 8.5 to bring about, especially for very deep dyeings, the full reactive bond between the dyes of the dye mixtures of the invention and the fiber. At the same time, the dye portion not reactively bound is removed.

The procedure described herein also applies to the production of dyeings on fiber materials composed of other natural polyamides or of synthetic polyamides and polyurethanes. In general, the material to be dyed is introduced into the bath at a temperature of about 40° C., agitated therein for some time, the dyebath is then adjusted to the desired weakly acidic, preferably weakly acetic, pH and the actual dyeing is carried out at a temperature between 60 and 98° C. However, the dyeings can also be carried out at the boil or in sealed dyeing apparatus at temperatures of up to 106° C. Since the water solubility of the dye mixtures of the invention is very good, they can also be used with advantage in customary continuous dyeing processes. The color strength of the dye mixtures of the invention is very high.

The dye mixtures of the invention produce bright, yellowish to bluish red dyeings on the materials mentioned, preferably fiber materials.

The Examples hereinbelow serve to illustrate the invention. Parts and percentages are by weight, unless otherwise stated. Parts by weight relate to parts by volume as the kilogram relates to the liter. The compounds described in the Examples in terms of a formula are indicated in the form of the free acids; in general, they are prepared and isolated in the form of their salts, preferably sodium or potassium salts, and used for dyeing in the form of their salts. The starting compounds mentioned in the form of the free acid in the following Examples, especially Table Examples, can similarly be used in the synthesis as such or in the form of their salts, preferably alkali metal salts, such as sodium or potassium salts.

EXAMPLE 1 a) A suspension of 319.2 parts of 1-amino-8-naphthol-3, 6-disulfonic acid in 1000 parts of water and 300 parts of ice is admixed with 190.1 parts of cyanuric chloride with thorough stirring; the reaction batch is additionally stirred for four hours between 0 and 15° C. and at a pH between 1.7 and 2.2 adjusted by means of sodium bicarbonate.

b) The solution of the dichlorotriazine compound of a) is combined with a pH 5.5 to 6.0 solution of 86.6 parts of aniline-3-sulfonic acid and 156 parts of 1-amino-8-naphthol-3,6-disulfonic acid in 640 parts of water. The pH is maintained at about 5 and the reaction mixture is warmed to a temperature of 30 to 45° C. in the course of one to two hours.

c) Separately, the diazonium salt of the diazo component is prepared: A pH 6.7 to 6.8 solution of 410.4 parts of 4-(β-sulfatoethylsulfonyl)aniline in 500 parts of water is admixed with 192 parts of 40% strength aqueous sodium nitrite solution. This mixture is added with thorough stirring to a mixture of 800 parts of comminuted ice and 160 parts of a 31% strength aqueous hydrochloric acid. The mixture is subsequently stirred at between 0° C. and 5° C. for an hour and then, as usual, excess nitrous acid is decomposed with a little amidosulfonic acid.

d) The secondary condensation product prepared under b) is combined with the diazonium salt solution described under c). To carry out the coupling reaction, the strongly acidic reaction mixture is adjusted with sodium carbonate to a pH of 4.5 to 5.0 at a temperature of about 15° C. and the temperature is raised to 20 to 25° C. Stirring is continued at that pH and temperature for a few hours until the coupling has ended.

A pH between 6.0 and 6.5 is then set by means of sodium carbonate, the batch is clarified by filtration and the filtrate is spray-dried, affording about 1600 parts of a powder which comprises an electrolyte salt, predominantly sodium chloride and sodium sulfate, and about 42% of the dye of the formula (A)

fiber-reactive dyes to the materials mentioned in the description part, such as cellulose fiber materials, especially cotton and viscose, produces strong red dyeings and prints having very good fastness properties, especially very good wash, light, alkali, acid, water, seawater, perspiration and rub fastness properties. The dyeings are also notable for their high degree of fixation and good build-up on the cellulose materials. The minimal tainting of adjacent polyester fabric in the continuous pad-steam process is particularly advantageous.

EXAMPLE 2

47.1 parts of cyanuric chloride and 79.8 parts of 1-amino-8-naphthol-3,6-disulfonic acid are rapidly added with thorough stirring to a mixture of 330 parts of water and 140 parts of ice, the batch is subsequently stirred for about 3.5 hours at a pH between 1.5 and 2.0 and a temperature between 10 and 15° C., and the solution of this primary condensation product is clarified by means of kieselguhr and filtration. The pH is then adjusted to 5 by means of calcium carbonate, and 26.0 parts of aniline-4-sulfonic acid and 39.1 parts of 1-amino-8-naphthol-3,6-disulfonic acid are added, the batch is stirred for two to three hours at a temperature of 18 to 22° C., then heated to 50 to 55° C. and is maintained at that temperature for 30 minutes while the pH of 4.0 to 4.5 is kept constant by means of calcium carbonate. The batch is stirred for a few hours more at 18 to 20° C. The solution is combined with a suspension (conventionally produced by

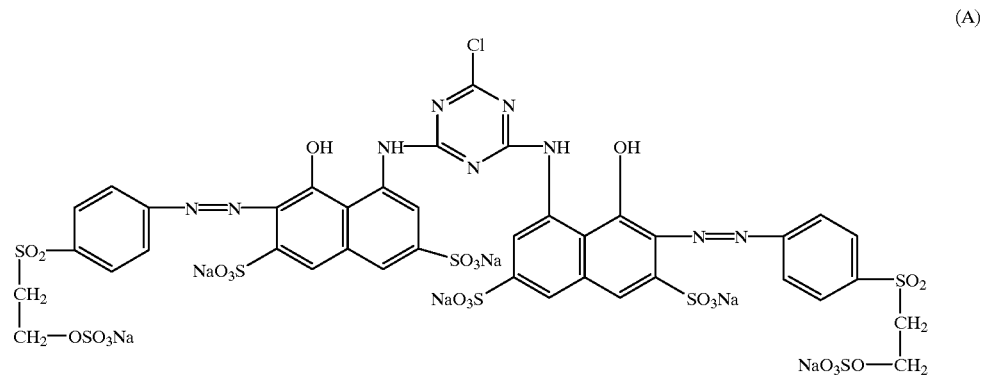

(A)

and about 28% of the dye of the formula (B)

diazotization with sodium nitrite and sulfuric acid in aque-

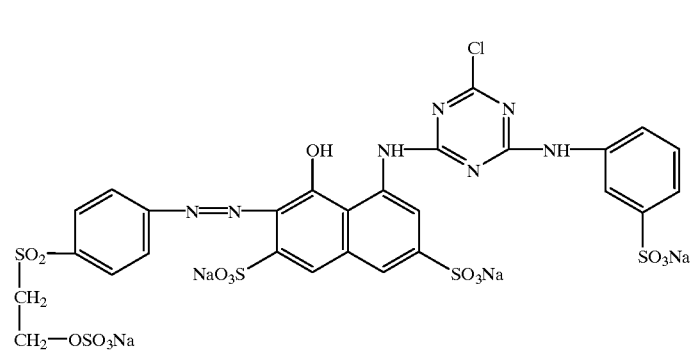

(B)

This mixture has very good dye properties and, applied by the application and fixing methods customary in the art for ous medium) of the diazonium salt of 102.1 parts of 3-(β-sulfatoethylsulfonyl)aniline, the strongly acidic coupling mixture is then adjusted to a pH of 4.0 to 4.5 by means of calcium carbonate at a temperature of about 10° C., and stirred for a few hours more at 10 to 14° C. and within this pH range, the calcium sulfate is filtered off with suction, washed with water, and the calcium ions in the combined filtrate and wash liquor are precipitated by means of sodium oxalate at a pH of 4.5 to 5.0 at a temperature of 30° C. Stirring for one hour is followed by filtration, and the dye mixture of the invention is isolated from the filtrate by spray drying.

This yields about 390 parts of a dark red powder which, as well as electrolyte salts, is about 44% strength with regard to the dye of the compound of the formula (C)

example similarly to one of the above Examples, with the aid of their starting components (cyanuric chloride or cyanuric fluoride, 1-amino-8-naphthol-3,6-disulfonic acid and an amino compound of the formula $HNR^4R^5$ as second condensation component and further amino compounds conforming to the general formulae (5a), (5b) and (5c) as diazo components and optionally with a further compound of the general formula $H—X^1$ and/or $H—X^2$ where $X^1$ and $X^2$ are each as defined above, except halogen.

The dye mixtures of the invention have very good application properties and applied by the dyeing and printing methods customary in the art, preferably by the application and fixing methods customary in the art for fiber-reactive (C)

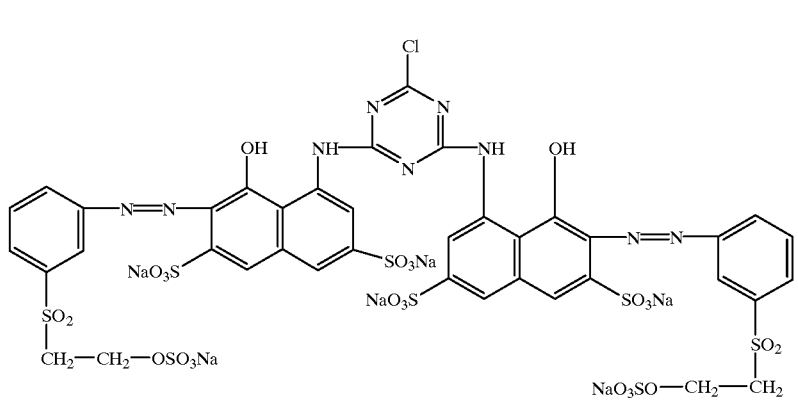

and about 28% strength with regard to the dye of the formula (D)

dyes, to the materials mentioned in the description part, especially cellulose fiber materials, produce strong dyeings (D)

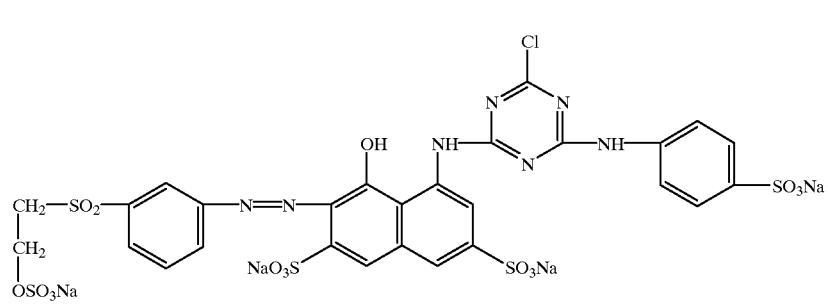

This dye mixture of the invention has very good application properties and applied by the printing and dyeing methods customary in the art for fiber-reactive dyes to cellulose fiber materials, for example, produces strong red dyeings and prints having very good manufacturing and use fastness properties, especially lightfastness, wash, perspiration, water and sea water fastness properties and also resistance to chlorinated tap water (chlorinated bath water). The fixation yield of this dye mixture of the invention on cellulose fiber materials is very high.

EXAMPLES 3 TO 92

The Table Examples which follow describe further dye mixtures of monoazo compounds of the general formulae (1) and (2) according to the invention in terms of their components. They can be prepared in an inventive manner either by mechanically mixing the individual dyes or chemically, for and prints having good fastness properties and good color build-up in the hue reported in the respective Table Example. The numerical ratios reported in the MR column specify the molar ratio in percent of the dye or dyes (1) to the dye or dyes (2) in which the dyes are present in the respective dye mixture.

| | Dye (1) | | | | | Dye (2) | | | | | |
|---|---|---|---|---|---|---|---|---|---|---|---|
| Ex. | $R^1$ | $R^2$ | $X^1$ | $-SO_2-Y^1$ | $-SO_2-Y^2$ | $R^3$ | $X^2$ | $R^4$ | $R^5$ | $-SO_2-Y^3$ | MR | Hue |
| 3 | H | H | Cl | 4-sulfato-ethylsulfonyl | 4-sulfato-ethylsulfonyl | H | Cl | H | 3-sulfo-phenyl | 4-sulfato-ethylsulfonyl | 90:10 | yellowish red |
| 4 | H | H | Cl | ditto | ditto | H | Cl | H | ditto | ditto | 80:20 | yellowish red |
| 5 | H | H | Cl | ditto | ditto | H | Cl | H | ditto | ditto | 70:30 | yellowish red |
| 6 | H | H | Cl | ditto | ditto | H | Cl | H | ditto | ditto | 60:40 | yellowish red |
| 7 | H | H | Cl | ditto | ditto | H | Cl | H | ditto | ditto | 55:45 | red |
| 8 | H | H | Cl | ditto | ditto | H | Cl | H | ditto | ditto | 50:50 | red |
| 9 | H | H | Cl | ditto | ditto | H | Cl | H | ditto | ditto | 45:55 | red |
| 10 | H | H | Cl | ditto | ditto | H | Cl | H | ditto | ditto | 40:60 | bluish red |
| 11 | H | H | Cl | ditto | ditto | H | Cl | H | ditto | ditto | 30:70 | bluish red |
| 12 | H | H | Cl | ditto | ditto | H | Cl | H | ditto | ditto | 20:80 | bluish red |
| 13 | H | H | Cl | ditto | ditto | H | Cl | H | ditto | ditto | 10:90 | bluish red |
| 14 | H | H | Cl | ditto | ditto | H | F | H | ditto | ditto | 45:55 | red |
| 15 | H | H | Cl | ditto | ditto | H | F | H | ditto | ditto | 50:50 | red |
| 16 | H | H | Cl | ditto | ditto | H | F | H | ditto | ditto | 45:55 | red |
| 17 | H | H | Cl | ditto | ditto | H | F | H | ditto | ditto | 60:40 | red |
| 18 | H | H | Cl | 4-sulfato-ethylsulfonyl | 4-sulfato-ethylsulfonyl | H | Cl | $CH_3$ | ditto | 4-sulfato-ethylsulfonyl | 60:40 | yellowish red |
| 19 | H | H | Cl | ditto | ditto | H | Cl | $CH_3$ | ditto | ditto | 50:50 | red |
| 20 | H | H | Cl | ditto | ditto | H | Cl | $C_2H_5$ | ditto | ditto | 60:40 | red |
| 21 | H | H | Cl | ditto | ditto | H | Cl | $C_2H_5$ | ditto | ditto | 50:50 | red |
| 22 | H | H | Cl | ditto | ditto | H | Cl | $C_4H_9$ | 4-Sulfo-phenyl | ditto | 55:45 | red |
| 23 | H | H | Cl | ditto | ditto | H | Cl | phenyl | 2-Sulfo-phenyl | ditto | 50:50 | red |
| 24 | H | H | Cl | ditto | ditto | H | F | $CH_3$ | β-(β''-sulfato-ethylsulfonyl)-ethyl | ditto | 45:55 | red |
| 25 | H | H | Cl | ditto | ditto | H | F | $CH_3$ | ditto | ditto | 40:60 | red |
| 26 | H | H | Cl | ditto | ditto | H | F | $CH_3$ | ditto | ditto | 70:30 | red |
| 27 | H | H | Cl | ditto | ditto | H | F | $CH_3$ | ditto | ditto | 50:50 | red |
| 28 | H | H | Cl | ditto | ditto | H | F | phenyl | ditto | ditto | 50:50 | red |
| 29 | H | H | Cl | ditto | ditto | H | Cl | phenyl | ditto | ditto | 45:55 | red |
| 30 | H | H | Cl | ditto | ditto | H | Cl | phenyl | ditto | ditto | 60:40 | red |
| 31 | H | H | Cl | ditto | ditto | H | Cl | phenyl | ditto | ditto | 55:45 | red |
| 32 | H | H | Cl | ditto | ditto | H | Cl | H | 2-sulfophenyl | ditto | 60:40 | red |

| | Dye (1) | | | | | Dye (2) | | | | | |
|---|---|---|---|---|---|---|---|---|---|---|---|
| Ex. | $R^1$ | $R^2$ | $X^1$ | $-SO_2-Y^1$ | $-SO_2-Y^2$ | $R^3$ | $X^2$ | $-NR^4R^5$ | $-SO_2-Y^3$ | MR | Hue |
| 33 | H | H | Cl | 4-sulfato-ethylsulfonyl | 4-sulfato-ethylsulfonyl | H | Cl | morpholino | 4-sulfato-ethylsulfonyl | 70:30 | red |
| 34 | H | H | Cl | ditto | ditto | H | Cl | ditto | ditto | 60:40 | red |
| 35 | H | H | Cl | ditto | ditto | H | Cl | ditto | ditto | 45:55 | red |
| 36 | H | H | Cl | ditto | ditto | H | Cl | ditto | ditto | 50:50 | red |
| 37 | H | H | Cl | ditto | ditto | H | Cl | ditto | ditto | 55:45 | red |
| 38 | H | H | Cl | ditto | ditto | H | Cl | ditto | ditto | 40:60 | bluish red |
| 39 | 2-sulfo | H | Cl | ditto | ditto | H | Cl | ditto | ditto | 70:30 | red |
| 40 | H | H | Cl | ditto | ditto | H | Cl | piperidino | ditto | 40:60 | bluish red |
| 41 | H | H | Cl | ditto | ditto | 2-sulfo | Cl | morpholino | ditto | 70:30 | red |
| 42 | H | H | Cl | ditto | ditto | H | Cl | ditto | ditto | 80:20 | red |
| 43 | H | H | Cl | ditto | ditto | H | Cl | ditto | ditto | 90:10 | red |
| 44 | 2-sulfo | H | Cl | ditto | ditto | 2-sulfo | Cl | ditto | ditto | 45:55 | red |
| 45 | H | H | Cl | ditto | ditto | 2-sulfo | Cl | ditto | ditto | 50:50 | red |
| 46 | 2-sulfo | H | F | ditto | ditto | H | F | ditto | ditto | 45:55 | red |
| 47 | H | H | F | ditto | ditto | H | F | ditto | ditto | 50:50 | red |

| | Dye (1) | | | | | Dye (2) | | | | | |
|---|---|---|---|---|---|---|---|---|---|---|---|
| Ex. | $R^1$ | $R^2$ | $X^1$ | $-SO_2-Y^1$ | $-SO_2-Y^2$ | $R^3$ | $X^2$ | $R^4$ | $R^5$ | $-SO_2-Y^3$ | MR | Hue |
| 48 | 5-sulfo | 5-sulfo | Cl | 3-sulfato-ethylsulfonyl | 3-sulfato-ethylsulfonyl | H | Cl | $CH_3$ | β-sulfoethyl | ditto | 75:25 | red |
| 49 | 5-sulfo | 5-sulfo | Cl | ditto | ditto | H | Cl | $CH_3$ | ditto | ditto | 50:50 | red |
| 50 | 5-sulfo | 5-sulfo | Cl | ditto | ditto | H | Cl | $CH_3$ | ditto | ditto | 70:30 | red |
| 51 | 5-sulfo | 5-sulfo | Cl | ditto | ditto | H | Cl | $CH_3$ | ditto | ditto | 60:40 | red |
| 52 | 5-sulfo | 5-sulfo | Cl | ditto | ditto | H | Cl | $CH_3$ | ditto | ditto | 55:45 | red |
| 53 | 5-sulfo | 5-sulfo | Cl | ditto | ditto | H | Cl | $CH_3$ | ditto | ditto | 50:50 | red |
| 54 | 5-sulfo | 5-sulfo | Cl | ditto | ditto | H | Cl | $CH_3$ | ditto | ditto | 45:55 | red |
| 55 | 5-sulfo | 5-sulfo | Cl | ditto | ditto | H | Cl | $CH_3$ | ditto | ditto | 40:60 | bluish red |
| 56 | 5-sulfo | 5-sulfo | Cl | ditto | ditto | H | Cl | $CH_3$ | ditto | ditto | 30:70 | bluish red |
| 57 | 5-sulfo | 5-sulfo | Cl | ditto | ditto | H | Cl | H | 3-sulfophenyl | ditto | 20:80 | bluish red |
| 58 | 5-sulfo | 5-sulfo | Cl | ditto | ditto | H | Cl | H | ditto | ditto | 10:90 | bluish red |

-continued

| | | | | | | | | | | | |
|---|---|---|---|---|---|---|---|---|---|---|---|
| 59 | 5-sulfo | 5-sulfo | Cl | ditto | ditto | H | F | H | ditto | ditto | 45:55 red |
| 60 | 5-sulfo | 5-sulfo | Cl | ditto | ditto | H | F | H | ditto | ditto | 50:50 red |
| 61 | 5-sulfo | 5-sulfo | Cl | ditto | ditto | H | F | H | ditto | ditto | 45:55 red |
| 62 | 5-sulfo | 5-sulfo | Cl | ditto | ditto | H | F | H | ditto | ditto | 60:40 red |
| 63 | 5-sulfo | 5-sulfo | Cl | ditto | ditto | H | Cl | $CH_3$ | β-sulfoethyl | ditto | 75:25 red |
| 64 | 5-sulfo | 5-sulfo | Cl | ditto | ditto | H | Cl | $CH_3$ | ditto | ditto | 50:50 red |
| 65 | 5-sulfo | 5-sulfo | Cl | ditto | ditto | H | Cl | $CH_3$ | ditto | ditto | 70:30 red |
| 66 | 5-sulfo | 5-sulfo | Cl | ditto | ditto | H | Cl | $CH_3$ | ditto | ditto | 60:40 red |
| 67 | 5-sulfo | 5-sulfo | Cl | ditto | ditto | H | Cl | $CH_3$ | ditto | ditto | 55:45 red |
| 68 | 5-sulfo | 5-sulfo | Cl | ditto | ditto | H | Cl | $CH_3$ | ditto | ditto | 50:50 red |
| 69 | 5-sulfo | 5-sulfo | Cl | ditto | ditto | H | Cl | $CH_3$ | ditto | ditto | 45:55 red |
| 70 | 5-sulfo | 5-sulfo | Cl | ditto | ditto | H | Cl | $CH_3$ | ditto | ditto | 40:60 bluish red |
| 71 | 5-sulfo | 5-sulfo | Cl | ditto | ditto | H | Cl | $CH_3$ | ditto | ditto | 30:70 bluish red |
| 72 | 5-sulfo | 5-sulfo | Cl | ditto | ditto | H | Cl | H | 3-sulfophenyl | ditto | 20:80 bluish red |
| 73 | 5-sulfo | 5-sulfo | Cl | ditto | ditto | H | Cl | H | ditto | ditto | 10:90 bluish red |
| 74 | 5-sulfo | 5-sulfo | Cl | ditto | ditto | H | F | H | ditto | ditto | 45:55 red |
| 75 | 5-sulfo | 5-sulfo | Cl | ditto | ditto | H | F | H | ditto | ditto | 50:50 red |
| 76 | 5-sulfo | 5-sulfo | Cl | ditto | ditto | H | F | H | ditto | ditto | 45:55 red |
| 77 | 5-sulfo | 5-sulfo | Cl | ditto | ditto | H | F | H | ditto | ditto | 60:40 red |
| 78 | 5-sulfo | 5-sulfo | Cl | ditto | ditto | H | Cl | $CH_3$ | β-sulfoethyl | ditto | 75:25 red |
| 79 | 5-sulfo | 5-sulfo | Cl | ditto | ditto | H | Cl | $CH_3$ | ditto | ditto | 50:50 red |
| 80 | 5-sulfo | 5-sulfo | Cl | ditto | ditto | H | Cl | $CH_3$ | ditto | ditto | 70:30 red |
| 81 | 5-sulfo | 5-sulfo | Cl | ditto | ditto | H | Cl | $CH_3$ | ditto | ditto | 60:40 red |
| 82 | 5-sulfo | 5-sulfo | Cl | ditto | ditto | H | F | $CH_3$ | ditto | ditto | 55:45 red |
| 83 | 5-sulfo | 5-sulfo | Cl | ditto | ditto | H | F | $CH_3$ | ditto | ditto | 50:50 red |
| 84 | 5-sulfo | 5-sulfo | Cl | ditto | ditto | H | F | $CH_3$ | ditto | ditto | 45:55 red |
| 85 | 5-sulfo | 5-sulfo | Cl | ditto | ditto | H | F | $CH_3$ | ditto | ditto | 40:60 bluish red |
| 86 | 5-sulfo | 5-sulfo | Cl | ditto | ditto | H | F | $CH_3$ | ditto | ditto | 30:70 bluish red |
| 87 | 5-sulfo | 5-sulfo | Cl | ditto | ditto | 2-sulfo | Cl | H | 3-sulfophenyl | ditto | 20:80 bluish red |
| 88 | 5-sulfo | 5-sulfo | Cl | ditto | ditto | 2-sulfo | Cl | H | ditto | ditto | 10:90 bluish red |
| 89 | 5-sulfo | 5-sulfo | Cl | ditto | ditto | 2-sulfo | F | H | ditto | ditto | 45:55 red |
| 90 | 5-sulfo | 5-sulfo | Cl | ditto | ditto | 2-sulfo | F | H | ditto | ditto | 50:50 red |
| 91 | 5-sulfo | 5-sulfo | Cl | ditto | ditto | 2-sulfo | F | H | ditto | ditto | 45:55 red |
| 92 | 5-sulfo | 5-sulfo | Cl | ditto | ditto | 2-sulfo | F | H | ditto | ditto | 60:40 red |

What is claimed is:

1. A dye mixture comprising one or more dyes of the general formula (1) and one or more dyes of the general formula (2) in a molar ratio of the dye or dyes (1) and the dye or dyes (2) of 90:10 to 10:90

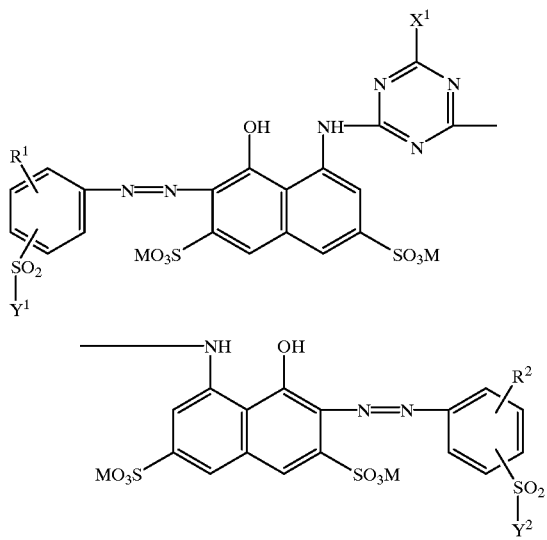

(1)

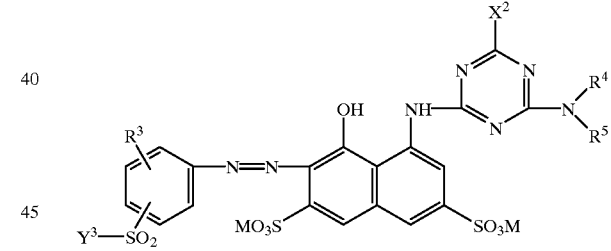

(2)

where:

M is hydrogen, an alkali metal or the equivalent of an alkaline earth metal;

$R^1$ is hydrogen or sulfo;

$R^2$ is hydrogen or sulfo;

$R^3$ is hydrogen or sulfo;

$X^1$ is chlorine, fluorine, hydroxy, alkoxy of 1 to 4 carbon atoms, phenyl, which may be substituted, or is optionally substituted N-morpholino or N-pyrimidino or is a group of the formula —NM-CN where M is as defined above or is an amino group of the below-defined formula —$NR^4R^5$;

$X^2$ is chlorine, fluorine, hydroxy, alkoxy of 1 to 4 carbon atoms, phenyl, which may be substituted, or is optionally substituted N-morpholino or N-pyrimidino or is a group of the formula —NM-CN where M is as defined above or is an amino group of the below-defined formula —NR$^4$R$^5$;

$Y^1$ is vinyl or is ethyl which is substituted in the β-position by an alkaline-eliminable substituent;

$Y^2$ has one of the meanings of $Y^1$;

$Y^3$ has one of the meanings of $Y^1$;

$R^4$ is hydrogen, alkyl of 1 to 4 carbon atoms, phenyl, monosulfophenyl, disulfophenyl, naphthyl, monosulfonaphthyl or disulfonaphthyl;

$R^5$ is hydrogen, alkyl of 1 to 6 carbon atoms, which may be substituted by 1 or 2 substituents from the group consisting of sulfo, carboxy, hydroxy, alkoxy of 1 to 4 carbon atoms and amino, or is alkyl of 2 to 6 carbon atoms which may be interrupted by a group —O— or —NH— and is substituted by a group of the formula —SO$_2$—Y$^4$ where Y$^4$ has a meaning of Y$^1$, or is phenyl which may be substituted by 1 or 2 substituents selected from the group consisting of sulfo, carboxy, hydroxy, alkoxy of 1 to 4 carbon atoms, alkyl of 1 to 4 carbon atoms and acetylamino, or is naphthyl, monosulfonaphthyl or disulfonaphthyl, or $R^4$ and $R^5$ are together an alkylene of 4 to 6 carbon atoms and combine with the nitrogen atom to form the radical of an aliphatic heterocycle, which alkylene may be interrupted by 1 or 2 hetero groups selected from the group consisting of the formulae —O—, —NH—, —N(CH$_3$)— and —NH—CO—;

the groups Y$^1$—SO$_2$—, —SO$_2$—Y$^2$ and Y$^3$—SO$_2$— are attached to the benzene nucleus meta or para to the azo group.

2. The dye mixture of claim 1, wherein R$^1$ is hydrogen.

3. The dye mixture of claim 1, wherein R$^2$ is hydrogen.

4. The dye mixture of claim 1, wherein R$^3$ is hydrogen.

5. The dye mixture of claim 1, wherein X$^1$ is chlorine.

6. The dye mixture of claim 1, wherein X$^1$ is fluorine.

7. The dye mixture of claim 1, wherein X$^2$ is chlorine.

8. The dye mixture of claim 1, wherein X$^2$ is fluorine.

9. The dye mixture of claim 1, wherein R$^4$ is hydrogen or methyl.

10. The dye mixture of claim 1, wherein R$^4$ is phenyl.

11. The dye mixture of claim 1, wherein R$^5$ is monosulfophenyl or disulfophenyl.

12. The dye mixture of claim 11, wherein R$^4$ is hydrogen.

13. The dye mixture of claim 1, wherein —NR$^4$R$^5$ is morpholino.

14. The dye mixture of claim 1, wherein Y$^1$, Y$^2$ and Y$^3$ are independently vinyl or β-sulfatoethyl.

15. The dye mixture of claim 1, wherein the dye or dyes of the general formula (1) and the dye or dyes of the general formula (2) are present in a molar ratio of 70:30 to 30:70.

16. The dye mixture of claim 1, wherein the dye or dyes of the general formula (1) and the dye or dyes of the general formula (2) are present in a molar ratio of 60:40 to 40:60.

17. A process for dyeing or printing hydroxy- and/or carboxamido-containing material which comprises applying said dye mixture as claimed in claim 1 in dissolved form to the material and the dye mixture is fixed on the material by means of heat or with the aid of an alkaline agent or by means of both measures.

18. A process of claim 17, wherein the material to be dyed is a fiber material.

* * * * *